(12) United States Patent
Feron et al.

(10) Patent No.: US 8,809,424 B2
(45) Date of Patent: Aug. 19, 2014

(54) PROCESS FOR PREPARING COMPOSITIONS BASED ON A STARCHY COMPONENT AND ON A SYNTHETIC POLYMER

(75) Inventors: Thierry Feron, Fouquieres les Bethune (FR); Rene Saint Loup, Lomme (FR); Jerome Gimenez, Villeurbanne (FR); Didier Lagneaux, Bluffy (FR); Henri Sautel, Villefontaine (FR)

(73) Assignee: Roquette Freres, Lestrem (FR)

( * ) Notice: Subject to any disclaimer, the term of this patent is extended or adjusted under 35 U.S.C. 154(b) by 142 days.

(21) Appl. No.: 13/003,802

(22) PCT Filed: Jul. 17, 2009

(86) PCT No.: PCT/FR2009/051435
§ 371 (c)(1),
(2), (4) Date: Jan. 12, 2011

(87) PCT Pub. No.: WO2010/010282
PCT Pub. Date: Jan. 28, 2010

(65) Prior Publication Data
US 2011/0118390 A1 May 19, 2011

(30) Foreign Application Priority Data
Jul. 24, 2008 (FR) ...................... 08 55097

(51) Int. Cl.
*C08L 3/00* (2006.01)
*C08L 89/00* (2006.01)
*D21H 19/54* (2006.01)

(52) U.S. Cl.
USPC ........................................................ 524/47

(58) Field of Classification Search
USPC .......................................................... 524/47
See application file for complete search history.

(56) References Cited

U.S. PATENT DOCUMENTS

| | | | | |
|---|---|---|---|---|
| 5,095,054 A * | 3/1992 | Lay et al. | ........................ | 524/47 |
| 5,256,711 A * | 10/1993 | Tokiwa et al. | .................. | 524/47 |
| 5,292,782 A * | 3/1994 | Bastioli et al. | .................. | 524/47 |
| 5,314,934 A * | 5/1994 | Tomka | ............. | 524/53 |
| 5,409,973 A * | 4/1995 | Bastioli et al. | .................. | 524/53 |
| 5,439,953 A * | 8/1995 | Ritter et al. | ...................... | 524/47 |
| 5,462,981 A * | 10/1995 | Bastioli et al. | .................. | 524/47 |
| 5,500,465 A * | 3/1996 | Krishnan et al. | ................. | 524/47 |
| 5,510,401 A * | 4/1996 | Dehennau et al. | ............. | 524/47 |
| 5,512,617 A * | 4/1996 | Ritter et al. | ...................... | 524/47 |
| 5,627,223 A * | 5/1997 | Dehennau et al. | ............. | 524/47 |
| 5,861,461 A * | 1/1999 | Lee et al. | .................... | 525/54.26 |
| 5,928,737 A * | 7/1999 | Hammer et al. | ............. | 428/34.8 |
| 6,008,276 A * | 12/1999 | Kalbe et al. | ....................... | 524/47 |
| 6,011,092 A * | 1/2000 | Seppala et al. | .................. | 524/47 |
| 6,117,925 A * | 9/2000 | Tomka | ............................ | 524/47 |
| 6,184,261 B1 * | 2/2001 | Biby et al. | ................... | 521/84.1 |
| 6,214,907 B1 * | 4/2001 | Tomka | ............................ | 524/47 |
| 6,218,321 B1 * | 4/2001 | Lorcks et al. | ................. | 442/165 |
| 6,231,970 B1 * | 5/2001 | Andersen et al. | ............. | 428/332 |
| 6,235,815 B1 * | 5/2001 | Loercks et al. | .................. | 524/47 |
| 6,235,816 B1 * | 5/2001 | Lorcks et al. | .................. | 524/47 |
| 6,277,899 B1 * | 8/2001 | Bastioli et al. | ................ | 523/128 |
| 6,365,079 B1 | 4/2002 | Winkler et al. | | |
| 6,376,583 B1 * | 4/2002 | Winkler et al. | ................. | 524/47 |
| 6,472,497 B2 * | 10/2002 | Loercks et al. | ................ | 528/196 |
| 6,506,824 B1 * | 1/2003 | Bastioli et al. | .................. | 524/47 |
| 6,821,588 B1 * | 11/2004 | Hammer et al. | ............. | 428/34.8 |
| 6,830,810 B2 * | 12/2004 | Bond | ............................ | 428/373 |
| 6,844,380 B2 * | 1/2005 | Favis et al. | ....................... | 524/52 |
| 6,962,950 B1 * | 11/2005 | Bastioli et al. | .................. | 524/47 |
| 7,077,994 B2 * | 7/2006 | Bond et al. | ......................... | 422/1 |
| 2001/0039303 A1 * | 11/2001 | Loercks et al. | ................. | 524/47 |
| 2002/0006989 A1 * | 1/2002 | Bastioli et al. | .................. | 524/47 |
| 2003/0109605 A1 * | 6/2003 | Bond et al. | ......................... | 524/47 |
| 2003/0119949 A1 * | 6/2003 | Favis et al. | ....................... | 524/47 |
| 2004/0096656 A1 * | 5/2004 | Bond | ............................ | 428/373 |
| 2004/0132873 A1 * | 7/2004 | Bailey et al. | .................... | 524/47 |
| 2004/0143072 A1 * | 7/2004 | Lewis et al. | .................... | 525/417 |
| 2004/0152857 A1 * | 8/2004 | Ohnishi et al. | ................ | 527/301 |
| 2004/0197554 A1 * | 10/2004 | Bond et al. | ......................... | 428/359 |
| 2005/0079785 A1 * | 4/2005 | Bond et al. | ..................... | 442/327 |

(Continued)

FOREIGN PATENT DOCUMENTS

DE 19533800 A1 4/1997
EP 1229075 A1 8/2002

OTHER PUBLICATIONS

"Initiation to Macromolecular Chemistry and Physicochemistry", 2000, Natural Polymers: Structure, Modifications, Applications, pp. 40-86, vol. 13, First Edition.

(Continued)

*Primary Examiner* — Liam J Heincer
(74) *Attorney, Agent, or Firm* — Young & Thompson

(57) ABSTRACT

Process for preparing a composition based on a synthetic polymer includes: introducing, into a reactor containing a softened or molten synthetic polymer, a non-plasticized starchy component and a plasticizer of the latter; and kneading the mixture obtained under conditions sufficient to obtain the plasticization of the starchy component by the plasticizer, and a homogeneous mixture of the synthetic polymer and of the plasticized starchy component. The reactor may especially be a co-rotating or counter-rotating single-screw or twin-screw extruder, for example a co-rotating twin-screw extruder. The synthetic polymer may advantageously be chosen from the group including polyethylenes (PE) and polypropylenes (PP), which are functionalized or unfunctionalized, polyamides (PA), thermoplastic polyurethanes (TPU), styrene-ethylene-butylene-styrene (SEBS) copolymers, preferably that are functionalized, amorphous polyethylene terephthalates (PETG) and blends thereof. The resulting compositions have improved characteristics, especially in terms of coloration and of mechanical properties, for example in terms of elongation at break.

24 Claims, No Drawings

(56) References Cited

U.S. PATENT DOCUMENTS

| | | | |
|---|---|---|---|
| 2007/0129468 A1* | 6/2007 | Bastioli et al. | 524/47 |
| 2008/0036115 A1* | 2/2008 | Ueda et al. | 264/291 |
| 2008/0287592 A1* | 11/2008 | Favis et al. | 524/500 |
| 2009/0012210 A1* | 1/2009 | Speer et al. | 523/124 |
| 2009/0124729 A1* | 5/2009 | Bailey et al. | 524/17 |
| 2009/0324917 A1* | 12/2009 | Wang et al. | 428/220 |
| 2010/0081737 A1* | 4/2010 | Bastioli et al. | 524/47 |
| 2010/0305271 A1* | 12/2010 | Mentink et al. | 525/54.26 |
| 2010/0311874 A1* | 12/2010 | Mentink et al. | 524/48 |
| 2010/0311905 A1* | 12/2010 | Mentink et al. | 525/54.31 |
| 2010/0331232 A1* | 12/2010 | Barker | 514/1.1 |
| 2011/0086949 A1* | 4/2011 | Mentink et al. | 524/48 |
| 2012/0157582 A1* | 6/2012 | Broyles et al. | 524/52 |

OTHER PUBLICATIONS

Wang H. et al., "Effects of Starch Moisture on Properties of Wheat Starch/Poly(Lactic acid) Blend Containing Methylenediphenyl Diisocyanate", Journal of Polymers and the Enironment Kluwer Academic/Plenum Press, New Your, NY, US, vol. 10, No. 4, Jan. 1, 2002, pp. 133-138, ISSN: *"Sample preparation" on p. 134*.

International Search Report, dated Dec. 29, 2009, from corresponding PCT application.

\* cited by examiner

PROCESS FOR PREPARING COMPOSITIONS BASED ON A STARCHY COMPONENT AND ON A SYNTHETIC POLYMER

The present invention relates to a novel process for preparing compositions based on a synthetic polymer and on a starchy component, and also to the compositions obtained by this process.

It has already been known practice for several decades to incorporate granular starch as a filler into plastics such as polyethylene. Before dispersing the starch in the synthetic polymer, the granular native starch is generally dried to a moisture content of less than 1% by weight, to reduce its hydrophilic nature, to facilitate the incorporation into the continuous matrix formed by the polymer and to stabilize the dispersion obtained. With the same aim, the starch was also precoated with fatty substances (fatty acids, silicones or siliconates) or modified, at the surface of the grains, by grafting with hydrophobic groups such as siloxanes, or reactive groups such as isocyanates. The materials thus obtained generally contained about 10%, and not more than 20%, by weight of granular starch, since the mechanical properties of the composite materials were insufficient beyond this value.

It was then envisioned to prepare materials, most often biodegradable, containing larger proportions of starch, the starch generally being, at a given point in the process for preparing the material, plasticized with a plasticizer that may be water. By way of example:

Patent U.S. Pat. No. 5,462,981 describes the preparation of biodegradable polymer blends based on a water-soluble polymer, in this case polyvinyl alcohol (known as "PVA"), preplasticized by extrusion under very specific conditions, said blends possibly containing from 20% to 70% by weight of starch. The granular starch is not preplasticized when it is placed in contact with PVA, which is then in solid form, i.e. in the form of extruded granules ("PLASTICIZED PVA GRANULES").

Patent DE 195 33 800 describes the preparation of biodegradable polymer blends that may contain even more starch. The starch may have been preplasticized before its introduction into the extruder, but, in practice, according to the examples, the starch plasticizer is used by simultaneously mixing with the starch and the polymer in solid form, in this case polyvinyl acetate ("PVAc").

Patent U.S. Pat. No. 6,365,079 describes compositions that may contain from 40% to 98% by weight of starch and from 2% to 60% by weight of a particular polymer of "thermoplastic hydroxy-functionalized polyetheramine" type. As in the preceding case, the starch may have been preplasticized before its introduction into the extruder, but, in practice, according to the examples, the starch plasticizer, in this case water, is used by simultaneously mixing with the starch and the polymer in solid form.

Patent US 2001/0 039 303 describes the preplasticization, by extrusion, of a starch with a very specific plasticizer, i.e. one that is simultaneously of polymeric, biodegradable and hydrophobic nature. The use of such a plasticizer makes it possible to dispense with the use of a standard starch plasticizer, of low molecular weight and whose presence, in the present case, is not desired so as not to reduce the physical and/or mechanical characteristics of the final material. In practice, this material contains one or more polymers other than the starch-plasticizing polymer ("additional polymers"), which are used, in the extruder, after plasticization of the starch with the polymeric plasticizer and, also, in a medium whose water content has necessarily been lowered to a very low level, i.e. less than 1%, to allow good plasticization of the starch and good compatibilization between the starch and its polymeric plasticizer.

Patent EP 1 229 075 describes starch-based thermoplastic compositions containing a phyllosilicate or a laminated silicate, and optionally a synthetic polymer. When, as in Example 4 of said patent, a synthetic polymer is used, in this case a biodegradable polyester of "Bionolle" or "Ecoflex" brand, it appears that the starch is used simultaneously, inter alia, with this synthetic polymer that is in solid form (granules) and with the starch plasticizer (glycerol/water mixture).

The article entitled "*Effects of Starch Moisture on Properties on Wheat Starch/Poly(Lactic Acid) Blend Containing Methylenediphenyl Diisocyanate*", by Wang et al., published in the *Journal of Polymers and the Environment*, Vol. 10, No. 4, October 2002, concerns the preparation of polymer compositions based on starch and on a biodegradable polymer, namely PLA. It appears that the starch plasticizer, in this case water, is used by simultaneously mixing with the starch and the polymer in solid form ("PLA chips") and preground.

In the course of its studies also directed toward developing polymers with a high starch content, the Applicant has recently envisioned the introduction of a starchy component preplasticized with a suitable plasticizer. The process developed by the Applicant especially described in French patent applications 08 50659 and 08 50660, filed on Feb. 1, 2008, comprises the thermomechanical mixing of a granular starch and of a plasticizer for the preparation, by extrusion, of granules of a thermoplastic starchy composition. The granules obtained are then incorporated into a molten synthetic polymer matrix. The presence of a bifunctional agent, such as methylenediphenyl diisocyanate, which is capable of reacting with the plasticizer and the starch, or even also with the polymer, allows the production of compositions with a high starch content that have good mechanical properties. The preparation of these compositions is performed by reactive extrusion.

However, when the Applicant used for the preparation of such compositions synthetic polymers with a high melting point, such as polypropylene or polyethylene, it observed undesirable coloration of the compositions obtained, ranging from yellow to dark brown. This coloration, attributed to the thermal degradation of the starch, was all the more pronounced the higher the temperatures and the longer the extrusion times.

These coloration phenomena had not been observed previously for the use of granular starch as thermoplastic polymer fillers, since unplasticized granular native starch proves to be considerably less sensitive to thermal degradation than plasticized starch.

Patent U.S. Pat. No. 6,844,380 discloses a process for preparing compositions based on thermoplastic polymer and on a plasticized starchy component, comprising the preparation, in a first extruder, of a gelatinized and plasticized starchy composition, introduction into the first extruder of a thermoplastic polymer melt originating from a second extruder, connected to the first, and direct mixing of the two components until a homogeneous composition is obtained. The process described in that patent thus has the same drawbacks as the one developed previously by the Applicant, namely prolonged exposure of a preplasticized starchy composition to high temperatures liable to result in thermal degradation and/or substantial coloration of the plasticized starchy material.

There was thus a need for a process for preparing compositions based on synthetic polymer and on plasticized starchy material, which would make it possible, even for synthetic polymers of high melting point, for example higher than 130° C., to minimize the thermal degradation of the starchy material and to limit or even eliminate the coloration of the final compositions obtained. All this would be achieved while at the same time maintaining, or even improving, the mechanical properties of the final compositions according to the prior art.

In seeking to limit the coloration by thermal degradation of plasticized starchy materials, the Applicant has discovered, against all expectation, that it is not necessary to plasticize the starchy component with a plasticizer prior to its incorporation into the synthetic polymer and that this plasticization can be performed very efficiently in the presence of said synthetic polymer. The Applicant observed, on this occasion, that by performing the process for plasticization of the starchy material with the plasticizer after the softening or melting of the synthetic polymer, final compositions that are comparatively less colored are obtained. This reduced coloration was attributed to reduced thermal degradation of the starchy material, which, when introduced in nonplasticized form, shows better resistance to degradation than in its plasticized form.

The present invention is thus based on the fact that it is not a preplasticized starchy component that is incorporated into the softened or molten synthetic polymer, but, separately, a nonplasticized starchy component and a plasticizer therefor.

The term "separately" as used herein does not exclude the simultaneous introduction of the starchy component and the plasticizer into the reactor, even in the form of a mixture. However, this term does exclude any process comprising the introduction, into the reactor containing the polymer, of a plasticized starchy composition obtained by thermomechanical treatment of a starchy component and of a plasticizer therefor, such as the processes described in French patent applications 08 50659 and 08 50660 from the Applicant or in patent U.S. Pat. No. 6 844 380.

A subject of the present invention is, more precisely, a process for preparing a composition based on a synthetic polymer and on a starchy component, said process comprising:
  the introduction, into a reactor, for example an extruder, containing a softened or molten synthetic polymer (component 1), of a nonplasticized starchy component (component 2) and of a plasticizer therefor (component 3), and
  blending of the mixture obtained under conditions sufficient to obtain plasticization of the starchy component (component 2) with the plasticizer (component 3) and homogeneous mixing of the synthetic polymer and of the plasticized starchy component.

The synthetic polymer may be chosen especially from thermoplastic polymers, the definition of thermoplastic polymers including, according to the present invention, thermoplastic elastomers.

The temperature of the softened or molten synthetic polymer when it is placed in contact with the nonplasticized starchy component may be identical to or different than that at which it is placed in contact with the plasticizer for the starchy component.

In addition, the temperature at which the plasticization of the starchy component by its plasticizer then takes place may also be identical to or different than this temperature.

In any case, these temperatures are generally all between 60° C. and 260° C. Preferably, they are between 80° C. and 240° C.

These temperatures may especially be:
  between 120° C. and 200° C., in particular between 130° C. and 190° C., when the synthetic polymer is chosen from polyolefins, in particular from polyethylenes (PE) and polypropylenes (PP), which may or may not be functionalized,
  between 100° C. and 230° C. when the synthetic polymer is chosen from polyamides (PA), thermoplastic polyurethanes (TPU), styrene-butylene-styrene (SBS) and styrene-ethylene-butylene-styrene (SEBS) copolymers, which are preferably functionalized, especially with maleic anhydride units, and
  between 100° C. and 180° C. when the synthetic polymer is chosen from amorphous polyethylene terephthalates) (PETG).

According to a first variant, the process according to the invention comprises:
  the introduction, into a reactor, for example an extruder, containing a softened or molten thermoplastic synthetic polymer (component 1), subjected to shear forces and heated to a temperature between 60° C. and 260° C., of a nonplasticized starchy component (component 2) and of a plasticizer therefor (component 3), and
  the blending of the mixture obtained, at a temperature of between 60° C. and 260° C., with a shear force and for a time that are sufficient to obtain plasticization of the starchy component (component 2) by the plasticizer (component 3) and homogeneous mixing of the polymer and of the plasticized starchy component.

Preferably, the mentioned temperatures are between 80° C. and 240° C. They may be within the more preferential ranges described above as a function of the nature of the polymer used (polyolefins, TPU, PA, SBE and SEBS, which are especially functionalized, or PETG).

As explained hereinabove, components 2 and 3 are introduced separately, either one after the other or simultaneously.

In one variant of the process, some or all of the nonplasticized starchy component (component 2) or of the plasticizer (component 3) is introduced into the reactor at the same time as the presoftened or molten synthetic polymer.

This process makes it possible not only to obtain final composite compositions (synthetic polymer/starchy material) that are less colored while having mechanical properties that are just as good or even improved, but is also easier to perform than the processes of the prior art, which:
  either comprise a separate step of extrusion, granulation and optional drying of the plasticized starchy composition (French patent applications 08 50659 and 08 50660) followed by a step of mixing of this plasticized starchy composition with the molten synthetic polymer,
  or require a complex installation comprising two extruders, one being connected laterally to the other (U.S. Pat. No. 6,844,380) so as to allow the mixing of the preplasticized starchy composition with the molten synthetic polymer.

The process of the present invention, in contrast, can be performed in a single reactor, preferably a single extruder, into which the at least three essential components (synthetic polymer, which is especially thermoplastic, plasticizer and nonplasticized starchy component) are separately introduced.

The term "plasticizer" for the starchy component means any molecule of low molecular mass, i.e. preferably having a molecular mass of less than 5000, which, when incorporated into the starchy component via a thermomechanical treatment at a temperature generally at least equal to 35° C., preferably between 60° C. and 260° C. and better still between 65° C.

and 200° C., results in a reduction of the glass transition temperature of the starchy component and/or in a reduction of its crystallinity.

The term "starchy component" means any oligomer or polymer of D-glucose units attached together via α-1,4 bonds and optionally other bonds, of α-1,6, α-1,2, α-1,3 or similar type.

When the term "nonplasticized" is used in the present invention in relation with "starchy component" or "granular starch", this does not necessarily imply the absence of any plasticizer. The starchy component, in particular the starch, may contain an amount of one or more compounds given in the list of plasticizers, which especially includes water. By using the term "nonplasticized", the Applicant wishes to specify that the starchy component has not undergone a thermomechanical treatment in the presence of said plasticizer, having as a consequence a significant lowering of its glass transition temperature and/or of its degree of crystallinity. The starchy component may thus be provided in powder or suspension form, including in water or another plasticizer, since it is not plasticized.

As explained above, the starchy component and the plasticizer are introduced separately into the reactor, either at the same time or one after the other, with, between these successive additions, an optional blending/heating phase.

The nonplasticized starchy component and the plasticizer may be introduced into the reactor via two different inlets, which may also be different from the inlet for the softened or molten synthetic polymer.

When these two components (starchy component and plasticizer) are added simultaneously, this addition may take place via two separate inlets, but also via the same inlet. In other words, an embodiment that envisions the introduction into the reactor of a nonplasticized starchy component/plasticizer mixture is not excluded from the scope of the independent claim.

In one preferred embodiment, the nonplasticized starchy component and the plasticizer are, however, introduced into the reactor via two separate inlets, these two inlets being advantageously different from the inlet for the softened or molten synthetic polymer.

As mentioned previously, the plasticizer may be introduced into the reactor before, at the same time as or after the nonplasticized starchy component.

In one particularly advantageous embodiment, the plasticizer is introduced into the reactor and incorporated into the synthetic polymer before the introduction of the nonplasticized starchy component.

Specifically, the Applicant has found, surprisingly, that the incorporation of the plasticizer into the synthetic polymer before introducing the nonplasticized starchy component did not efficiently prevent the subsequent plasticization of said component by the plasticizer.

The introduction of the starchy component after that of the plasticizer has the advantage of exposing the starchy component for as short a time as possible to the thermomechanical conditions prevailing in the reactor, which are liable to lead to the thermal degradation of the starchy component and to undesirable coloring of the final compositions.

It is particularly advantageous and simple to perform the process according to the invention using an extruder as reactor. This may be a single-screw or twin-screw, corotating or counterrotating extruder. In a particularly advantageous manner, the extruder is a twin-screw extruder, particularly corotating.

In one particularly advantageous embodiment, the process of the present invention comprises the following successive steps:
(a) introduction of a thermoplastic synthetic polymer into an extruder,
(b) heating and blending of the thermoplastic synthetic polymer at a temperature of between 60° C. and 260° C.,
(c) introduction into the extruder and incorporation into the heated thermoplastic synthetic polymer of a plasticizer for the starchy component added in the following step,
(d) introduction into the extruder and incorporation into the mixture obtained in the preceding step of a nonplasticized starchy component,
(e) blending of the mixture obtained, at a temperature of between 60° C. and 260° C., with a shear force and for a time that are sufficient to obtain plasticization of the starchy component by the plasticizer and homogeneous mixing of the polymer and of the plasticized starchy component, and
(f) forming of the homogeneous mass obtained.

In the process of the present invention, all of the blending steps of the synthetic polymer alone or of any multicomponent mixture especially including:
the polymer/plasticizer mixture,
the polymer/plasticizer/starchy component mixture,
the polymer/plasticizer/starchy component/linker mixture (defined later)
are performed at a temperature of between 60° C. and 260° C. and preferably between 80° C. and 240° C.

They may be within the more preferential ranges described above as a function of the nature of the polymer used (polyolefins, TPU, PA, SBE and SEBS, which are especially functionalized, or PETG).

Maintenance of these temperatures generally, but not systematically, requires the input of heat by means of a suitable heating device. In certain cases, maintaining the temperature may be obtained, in a known manner, by virtue of the shear and compression forces of the mixing of the ingredients, combined with means for thermal insulation of the reactor.

It is also not excluded, in the context of the invention, to introduce the thermoplastic synthetic polymer into the reactor in a presoftened or molten state, and especially at a sufficient temperature such that just the heat provided by said polymer is sufficient to ensure the subsequent plasticization in said reactor of the starchy component by the plasticizer.

The choice of the temperature profile as a function of the nature and viscosity of the synthetic polymer, the shear forces used, and the proportions of the various components of the mixture is within the scope of a person skilled in the art.

According to the invention, the nonplasticized starchy component may be used with its water of constitution and may thus advantageously have a water content generally of between 10% and 20% and especially between 12% and 20% by weight. It may also be used after having been more or less substantially dried, for example such that its water content has been lowered beforehand to a value of less than 10% and in particular less than 7% by weight. The water content of the nonplasticized starchy component used may even be less than 5% or even less than 2.5% by weight.

In one variant of the process of the present invention, in particular when the synthetic polymer, for example a polyamide or a polyester, the starchy component and/or the plasticizer comprises an appreciable fraction of water, the process also includes a step of drying the homogeneous mixture of the polymer and of the plasticized starchy component. This drying is preferably performed within the reactor itself, in particular by means of a pressure reduction. Thus, the pressure may be lowered and adjusted to a value, for example, of between 2 and 1000 millibar and in particular between 10 and 800 millibar.

After drying, the dried homogeneous mixture preferably has a water content of less than 5%, more preferentially less than 2.5% and better still less than 1.5%.

When the process comprises an optional step of introduction and of reaction of a linker, which is described in greater detail hereinbelow, the step of drying of the homogeneous mixture is performed before introducing the linker into the reactor. This predrying step is moreover particularly useful when a linker comprising reactive functions that can be hydrolyzed is used.

The nonplasticized starchy component may be a granular starch. The term "granular starch" means herein a native starch or a starch that is physically, chemically or enzymatically modified, which has conserved in the starch granules a semicrystalline structure similar to that found in starch grains naturally present in the storage organs and tissues of higher plants, in particular in cereal seeds, legume seeds, potato or cassava tubers, roots, bulbs, stems and fruit. This semicrystalline state is essentially due to the amylopectin macromolecules, which is one of the two main constituents of starch. In native form, the starch grains have a degree of crystallinity ranging from 15% to 45%, which depends essentially on the botanical origin of the starch and of the treatment to which it may have been subjected.

Granular starch, placed under polarized light, has a characteristic black cross, known as a Maltese cross, which is typical of the granular form. For a more detailed description of granular starch, reference may be made to chapter II entitled "Structure et morphologie du grain d'amidon [Structure and morphology of starch grains]" by S. Perez in the book "Initiation à la chimie et à la physico-chimie macromoleculaires [Introduction to macromolecular chemistry and physicochemistry]", first edition 2000, volume 13, pages 41 to 86, Groupe Francais d'Etudes et d'Applications des Polymères.

According to the invention, the granular starch may originate from any botanical source, including a granular starch rich in amylose or, conversely, rich in amylopectin (waxy). It may be native starch of cereals such as wheat, corn, barley, triticale, sorghum or rice, tubers such as potato or cassava, or legumes such as pea and soybean, and mixtures of such starches.

According to one variant, the granular starch is a starch that has been hydrolyzed via an acidic, oxidative or enzymatic route, or an oxidized starch. It may be a starch commonly known as fluidized starch or a white dextrin.

According to another variant, it may also be a starch that has been physicochemically modified but that has essentially conserved the structure of the starting native starch, especially such as esterified and/or etherified starches, in particular modified by acetylation, hydroxypropylation, cationization, crosslinking, phosphorylation or succinylation, or starches treated in an aqueous medium at low temperature ("annealing"). Preferably, the granular starch is a native, hydrolyzed, oxidized or modified starch, in particular from corn, wheat or pea.

The granular starch generally has a content of matter that is soluble at 20° C. in demineralized water of less than 5% by mass. It is preferably virtually insoluble in cold water.

According to a second variant, the starch selected as starchy component is a water-soluble starch, which may also originate from any botanical source, including a water-soluble starch that is rich in amylose or, conversely, rich in amylopectin (waxy). This water-soluble starch may be introduced in partial or total replacement for the granular starch.

For the purposes of the invention, the term "water-soluble starch" means any starchy component having at 20° C. and with mechanical stirring for 24 hours a fraction that is soluble in demineralized water at least equal to 5% by weight. This soluble fraction is preferably greater than 20% by weight and in particular greater than 50% by weight. Needless to say, the water-soluble starch may be totally soluble in demineralized water (soluble fraction=100%).

The water-soluble starch may be advantageously used according to the invention in solid form, preferably with a low water content, generally of less than 10% and especially less than 5% by weight, and better still in a solid form with a water content of less than 2.5% by weight, including a substantially anhydrous form (water content of less than 0.5% or even 0.2% by weight).

Such water-soluble starches may be obtained by pregelatinization on a drum, by pregelatinization on an extruder, by atomization of a suspension of a starchy solution, by precipitation from a nonsolvent, by hydrothermal cooking, by chemical functionalization or the like. It may in particular be an extruded or atomized pregelatinized starch, a highly transformed dextrin (also known as yellow dextrin), a maltodextrin, a functionalized starch or any mixture of these products.

Pregelatinized starches may be obtained by hydrothermal gelatinization treatment of native starches or of modified starches, in particular by steam cooking, jet-cooker cooking, cooking on a drum, cooking in blender/extruder systems followed by drying, for example in an oven, with hot air on a fluidized bed, on a rotating drum, by atomization, by extrusion or by lyophilization. Such starches generally have a solubility in demineralized water at 20° C. of greater than 5% and more generally between 10% and 100% and a degree of crystallinity of the starch of less than 15%, generally less than 5% and usually less than 1%, or even zero. Examples that may be mentioned include the products manufactured and sold by the Applicant under the brand name Pregeflo®.

Highly transformed dextrins may be prepared from native or modified starches, by dextrinification in a sparingly hydrated acidic medium. They may in particular be soluble white dextrins or yellow dextrins. Examples that may be mentioned include the products Stabilys® A 053 or Tackidex® C 072 manufactured and sold by the Applicant. Such dextrins have, in demineralized water at 20° C., a solubility generally of between 10% and 95% and a starch crystallinity of less than 15% and generally less than 5%.

Maltodextrins may be obtained by acid, oxidizing or enzymatic hydrolysis of starches in aqueous medium. They may in particular have a dextrose equivalent (DE) of between 0.5 and 40, preferably between 0.5 and 20 and better still between 0.5 and 12. Such maltodextrins are manufactured and sold, for example, by the Applicant under the trade name Glucidex® and have a solubility in demineralized water at 20° C. generally of greater than 90% or even close to 100%, and a lower starch crystallinity generally of less than 5% and usually virtually zero.

Functionalized starches may be obtained from a native or modified starch. The high functionalization may be performed, for example, by esterification or etherification to a sufficient level to give it solubility in water. Such functionalized starches have a soluble fraction, as defined above, of greater than 5%, preferably greater than 10% and better still greater than 50%.

Functionalization may be obtained in particular by acetylation in aqueous phase of acetic anhydride, of mixed anhydrides, hydroxypropylation in glue phase, cationization in dry phase or glue phase, anionization in dry phase or glue phase by phosphorylation or succinylation. These highly functionalized water-soluble starches may have a degree of substitution of between 0.01 and 3 and better still between 0.05 and 1.

Preferably, the starch modification or functionalization reagents are of renewable origin.

According to another advantageous variant, the water-soluble starch is a water-soluble starch from corn, wheat or pea, or a water-soluble derivative thereof.

Furthermore, it advantageously has a low water content, generally of less than 10%, preferably less than 5%, in particular less than 2.5% by weight and ideally less than 0.5%, or even less than 0.2% by weight.

According to a third variant, the starchy component selected for the preparation of the composition according to the invention is an organomodified and preferably organosoluble starch, which may also originate from any botanical source, including an organomodified and preferably organosoluble starch that is rich in amylose or, conversely, rich in amylopectin (waxy). This organosoluble starch may be introduced in partial or total replacement of the granular starch or the water-soluble starch.

For the purposes of the invention, the term "organomodified starch" means any starchy component other than a granular starch or a water-soluble starch according to the definitions given above. Preferably, this organomodified starch is virtually amorphous, i.e. it has a degree of starch crystallinity of less than 5%, generally less than 1% and especially zero. It is also preferably "organosoluble", i.e. it has, at 20° C., a fraction that is soluble in a solvent chosen from ethanol, ethyl acetate, propyl acetate, butyl acetate, diethyl carbonate, propylene carbonate, dimethyl glutarate, triethyl citrate, dibasic esters, dimethyl sulfoxide (DMSO), dimethylisosorbide, glyceryl triacetate, isosorbide diacetate, isosorbide dioleate and methyl esters of plant oils, at least equal to 5% by weight. This soluble fraction is preferably greater than 20% by weight and in particular greater than 50% by weight. Needless to say, the organosoluble starch may be totally soluble in one or more of the solvents indicated above (soluble fraction=100%).

The organomodified starch may be used according to the invention in solid form, including a form with a relatively low water content, i.e. less than 10% by weight. It may especially be less than 5%, in particular less than 2.5% by weight and ideally less than 0.5% or even less than 0.2% by weight.

The organomodified starch that may be used in the composition according to the invention may be prepared via high functionalization of native or modified starches such as those presented above. This high functionalization may be performed, for example, by esterification or etherification to a sufficiently high level to make it essentially amorphous and to give it insolubility in water and preferably solubility in one of the above organic solvents. Such functionalized starches have a soluble fraction, as defined above, of greater than 5%, preferably greater than 10% and better still greater than 50%.

The high functionalization may be obtained in particular by acetylation in a solvent phase with acetic anhydride, grafting, for example in a solvent phase, or by reactive extrusion, of acid anhydrides, of mixed anhydrides, of fatty acid chlorides, of caprolactone or lactide oligomers, hydroxypropylation and crosslinking in glue phase, cationization and crosslinking in dry phase or in glue phase, anionization by phosphorylation or succinylation and crosslinking in dry phase or in glue phase, silylation, or telomerization with butadiene. These highly functionalized organomodified, preferably organosoluble, starches may in particular be starch, dextrin or maltodextrin acetates or fatty esters of these starchy materials (starches, dextrins or maltodextrins) with fatty chains from 4 to 22 carbons, all these products preferably having a degree of substitution (DS) of between 0.5 and 3.0, preferably between 0.8 and 2.8 and especially between 1.0 and 2.7.

They may be, for example, starch, dextrin or maltodextrin hexanoates, octanoates, decanoates, laurates, palmitates, oleates or stearates, in particular with a DS of between 0.8 and 2.8.

According to another advantageous variant, the organomodified starch is an organomodified corn, wheat or pea starch or an organomodified derivative thereof.

The starchy component is incorporated into the synthetic polymer preferably to a proportion of from 10% to 10 000% by dry weight and preferably to a proportion of from 20% to 5000% by dry weight relative to the dry weight of the synthetic polymer present in the composition.

In practice, a ratio, as expressed above, of between 20% and 3000%, preferably between 20% and 1000% and even more preferentially of between 20% and 500% is generally preferably used.

The Applicant Company has especially found that this ratio may advantageously be between 20% and 400%, preferably between 20% and 200% and in particular between 25% and 150%, especially when the synthetic polymer is chosen from the group comprising polyethylenes (PE) and polypropylenes (PP), which may or may not be functionalized, polyamides (PA), thermoplastic polyurethanes (TPU), styrene-ethylene-butylene-styrene (SEBS) copolymers, preferably functionalized, amorphous poly(ethylene terephthalates) (PETG) and mixtures thereof.

The third component used in the process of the present invention, namely the plasticizer, is preferably chosen from water, diols, triols and polyols such as glycerol, polyglycerols, isosorbide, sorbitans, sorbitol, mannitol, and hydrogenated glucose syrups, salts of organic acids such as sodium lactate, urea, and any mixture of these products. The plasticizer advantageously has a molar mass of less than 5000, preferably less than 1000 and in particular less than 400. The plasticizer preferably has a molar mass of greater than 18, in other words it preferably does not include water.

The plasticizer for the starchy component, most particularly when said component is organomodified, may be chosen from methyl or ethyl esters or organic fatty acids such as lactic acid, citric acid, succinic acid, adipic acid or glutaric acid, or acetic esters or fatty monoalcohols, diols, triols or polyols such as ethanol, diethylene glycol, glycerol or sorbitol. Examples that may be mentioned include glyceryl diacetate (diacetin), glyceryl triacetate (triacetin), isosorbide diacetate, isosorbide dioctanoate, isosorbide dioleate, isosorbide dilaurate, dicarboxylic acid esters or dibasic esters (DBE) and any mixture of these products.

Whether or not the incorporation of a linker described in greater detail hereinbelow is envisioned, the process of the present invention may involve an amount of plasticizer used which, advantageously, is relatively high relative to the amount of plasticizer used in the plasticized starches of the prior art. The plasticizer is then advantageously used in a proportion of from 10 to 150 parts by weight, preferably in a proportion of from 25 to 120 parts by weight and in particular in a proportion of from 40 to 120 parts by weight, per 100 parts by weight of starchy component.

The starchy component (component 2), its plasticizer (component 3) and the synthetic polymer (component 1) may represent, together, 100% by weight (dry/dry) of the polymeric, especially thermoplastic, composition obtained according to the invention.

Additives of any nature, including those detailed hereinbelow, may, however, be incorporated into said composition. Although the proportion of these additional ingredients may be relatively high, the starchy component (component 2), its plasticizer (component 3) and the synthetic polymer (component 1) represent, together, preferably at least 30%, more preferentiallly at least 40% and in particular at least 50% by weight (dry/dry) of said composition.

According to one preferential variant, this overall proportion is at least equal to 80% by weight (dry/dry) of said composition.

A subject of the present invention is also a polymeric, especially thermoplastic, composition comprising very specific proportions of starchy component (component 2), of its plasticizer (component 3) and of synthetic polymer (component 1), said composition being characterized in that it comprises:

from 15% to 85% and preferably from 15% to 80% by weight of at least one starchy component (component 2),
from 4% to 35% by weight of at least one plasticizer for said starchy component (component 3), and
from 5% to 80% and preferably from 15% to 80% by weight of at least one synthetic polymer (component 1), which is especially thermoplastic, these percentages being expressed as dry weight and relative to the total dry weight of said composition.

All the preferred variants and ranges described hereinabove or hereinbelow concerning the nature and the respective proportions of the various ingredients also apply to this composition according to the invention.

It is especially possible to list the following advantageous variants, which may or may not be combined:

said composition comprises from 15% to 70% and preferably from 15% to 60% by weight of at least one starchy component, from 4% to 25% by weight of at least one plasticizer for said starchy component and from 15% to 80% and preferably from 35% to 80% by weight of at least one synthetic polymer,
the synthetic polymer is not biodegradable,
the synthetic polymer is not water-soluble,
the synthetic polymer is chosen from the group comprising polyethylenes (PE) and polypropylenes (PP), which are optionally functionalized, polyamides (PA), thermoplastic polyurethanes (TPU), styrene-ethylene-butylene-styrene (SEBS) copolymers, which are preferentially functionalized, amorphous polyethylene terephthalates) (PETG) and mixtures thereof,
the synthetic polymer is not biodegradable or compostable within the meaning of standards EN 13432, ASTM D 6400 and ASTM D 6868, and/or
the synthetic polymer is a polymer containing at least 50%, preferably at least 70% and in particular more than 80% of carbon of renewable origin within the meaning of standard ASTM D 6852 and/or standard ASTM D 6866, relative to the total carbon present in said polymer.

Among the additives, at least one linker may in particular be incorporated into said composition.

As results from the teaching of French patent applications 08 50659 and 08 50660 from the Applicant, it may be particularly advantageous to incorporate into the compositions of the present invention a linker, i.e. a compound comprising at least two functions capable of reacting and of forming covalent bonds with reactive functions present on the starchy component (OH groups), on the plasticizer (e.g. OH, C=O or NH groups) and optionally on the synthetic polymer. The reaction of this linker helps to bond the various components together, thus improves their compatibility and gives the final compositions obtained excellent mechanical properties and good water resistance.

The process of the present invention may consequently also comprise a step of incorporating at least one linker chosen from compounds bearing at least two free or masked, identical or different functions chosen from isocyanate, carbamoylcaprolactam, epoxide, halo, protonic acid, acid anhydride, acyl halide, oxychloride, trimetaphosphate and alkoxysilane functions.

This optional step of incorporating a linker is, needless to say, preferably subsequent to the incorporation of the non-plasticized starchy component and of the plasticizer into the synthetic polymer. Specifically, the introduction of such an agent at an early stage might lead to undesirable thickening or crosslinking of the system before the incorporation of all of the compounds that it is desired to bond together.

Examples of linkers that may be mentioned include:

diisocyanates, preferably methylenediphenyl diisocyanate (MDI), isophorone diisocyanate (IPDI), dicyclohexylmethane diisocyanate (H12MDI), toluene diisocyanate (TDI), naphthalene diisocyanate (NDI), hexamethylene diisocyanate (HMDI) and lysine diisocyanate (LDI),
dicarbamoylcaprolactams, preferably 1,1'-carbonylbis-caprolactam,
diepoxides,
compounds comprising an epoxide function and a halo function, preferably epichlorohydrin,
organic diacids, preferably succinic acid, adipic acid, glutaric acid, oxalic acid, malonic acid or maleic acid, and the corresponding anhydrides,
polyacids, preferably mellitic acid and derivatives thereof, such as trimellitic acid or pyromellitic acid,
oxychlorides, preferably phosphorus oxychloride,
trimetaphosphates, preferably sodium trimeta-phosphate,
alkoxysilanes, preferably tetraethoxysilane,
heterocyclic compounds, preferably bis-oxazolines, bis-oxazalin-5-ones and bis-azlactones,
methylenic or ethylenic diester derivatives, preferably methyl or ethyl carbonate derivatives.

Needless to say, a mixture of several of these compounds may be used.

In a particularly preferred manner, a diisocyanate is used as linker, and among these isophorone diisocyanate (IPDI) or dicyclohexylmethane diisocyanate (H12MDI), which make it possible to obtain final compositions that are particularly sparingly colored.

The amount of linker is generally between 0.01% and 15%, preferably between 0.1% and 12% and even more preferentially between 0.1% and 9%, relative to the total weight of the mixture containing the synthetic polymer, the starchy component and the plasticizer.

The present invention is in no way limited to the use of a particular family of synthetic polymers. Specifically, it is possible to perform the process according to the invention with any synthetic polymer, especially a thermoplastic polymer, that is sufficiently fluid at the blending temperatures (60° C. to 260° C.) to allow the incorporation of the starchy component, the plasticizer and the optional linker. Needless to say, the polymer must withstand chemical degradation at the maximum blending temperature used.

The synthetic polymer may be obtained from monomers of fossil origin and/or from monomers derived from renewable natural resources.

The synthetic polymer advantageously comprises functions containing active hydrogen and/or functions that give, especially by hydrolysis, such functions containing active hydrogen.

The synthetic polymer obtained from monomers of fossil origin, preferably comprising functions containing active hydrogen, may be chosen from synthetic polymers of polyester, polyacrylic, polyacetal, polycarbonate, polyamide, polyimide, polyurethane, polyolefin, functionalized polyolefin, styrene, functionalized styrene, vinyl, functionalized vinyl, fluoro, functionalized fluoro, chloro, functionalized chloro, functionalized polysulfone, functionalized polyphenyl ether, functionalized polyphenyl sulfide, functionalized silicone and functionalized polyether type.

Examples that may be mentioned include PLA, PBS, PBSA, PBAT, PET, polyamides (PA) 6, 6-6, 6-10, 6-12, 11 and 12, copolyamides, polyacrylates, poly(vinyl alcohol), poly(vinyl acetate), poly(vinyl chloride) (PVC) and poly(vinylidene fluoride) (PVDF), which are optionally functionalized, for example with maleic anhydride units, ethylene-vinyl acetate (EVA) copolymers, ethylene-methyl acrylate (EMA) copolymers, ethylene-vinyl alcohol (EVOH) copolymers, polyoxymethylenes (POM), acrylonitrile-styrene-acrylate (ASA) copolymers, thermoplastic polyurethanes (TPU), polyethylenes or polypropylenes functionalized, for example, with silane, acrylic or maleic anhydride units and styrene-butylene-styrene (SBS) and styrene-ethylene-butylene-styrene (SEBS) copolymers, which are preferably functionalized, for example with maleic anhydride units, amorphous polyethylene terephthalates) (PETG) and any mixture of these polymers.

The synthetic polymer may also be a polymer synthesized from monomers obtained from short-term renewable natural resources, for instance plants, microorganisms or gases, especially from sugars, glycerol, oils or derivatives thereof such as mono-, di- or polyfunctional alcohols or acids, and in particular from molecules such as bioethanol, bioethylene glycol, biopropane diol, biosourced 1,3-propanediol, biobutanediol, biosourced lactic acid or succinic acid, glycerol, isosorbide, sorbitol, sucrose or diols derived from plant or animal oils, and resinous acids extracted from pine.

It may especially be polyethylene derived from bioethanol, polypropylene derived from biopropanediol, polyesters of PLA or PBS type based on biosourced lactic acid or succinic acid, polyesters of PBAT type based on biosourced butanediol or succinic acid, polyesters of Sorona® type based on biosourced 1,3-propanediol, polycarbonates containing isosorbide, polyethylene glycols based on bioethylene glycol, polyamides based on castor oil or plant polyols, and polyurethanes based, for example, on plant diols, glycerol, isosorbide, sorbitol or sucrose.

Preferably, the synthetic polymer is chosen from ethylene-vinyl acetate (EVA) copolymers, polyolefins, especially polyethylenes (PE) and polypropylenes (PP), which are optionally functionalized, especially with silane units, acrylic units or maleic anhydride units, polyamides (PA) and copolyamides, thermoplastic polyurethanes (TPU), poly(butylene succinate) (PBS), poly(butylene succinate-co-adipate) (PBSA), poly(butylene adipate terephthalate) (PBAT), styrene-butylene-styrene (SBS) and styrene-ethylene-butylene-styrene (SEBS) copolymers, which are preferably functionalized, especially with maleic anhydride units, amorphous poly(ethylene terephthalates) (PETG), synthetic polymers obtained from biosourced monomers, and mixtures thereof.

According to a particularly advantageous variant, the synthetic polymer is chosen from the group comprising functionalized and non-functionalized polyethylenes (PE) and polypropylenes (PP), polyamides (PA), thermoplastic polyurethanes (TPU), styrene-ethylene-butylene-styrene (SEBS) copolymers, which are preferably functionalized, and amorphous poly(ethylene terephthalates) (PETG), and mixtures thereof.

The abovementioned preferential polymers, for example polyolefins and TPU, are in effect polymers that require relatively high operating temperatures and the benefit of the process of the present invention, namely protection against the thermal degradation of starch, is particularly high for this group of polymers.

In addition, these polymers, for example polyolefins and TPU, cannot, in industrial practice and as has been found by the Applicant, be introduced together with the starchy component and its plasticizer. A use of granules of such polymers, for example of polypropylene, in the presence of the starchy component and of its plasticizer generates a viscous mass or "paste" that cannot be introduced into an extruder unless a large volume of water is added to fluidize said mass. This has the effect, given the difference in density between the components of this fluidized mass, of separating the polymer granules from the other components and thus of leading to heterogeneity of the resulting mixture and difficulty in metering it out. This is also a benefit of the process of the present invention.

Advantageously, the synthetic polymer has a weight-average molecular weight of between 8500 and 10 000 000 daltons, in particular between 15 000 and 1 000 000 daltons.

According to another preferential variant, the synthetic polymer is not biodegradable or compostable within the meaning of standards EN 13432, ASTM D 6400 and ASTM D 6868.

It may especially be nonbiodegradable.

According to another preferential variant, the synthetic polymer is a polymer containing at least 15%, preferably at least 30%, in particular at least 50%, better still at least 70% or even more than 80% of carbon of renewable origin within the meaning of standard ASTM D 6852 and/or standard ASTM D 6866, relative to the total carbon present in said polymer.

Finally, according to another preferential variant, the synthetic polymer is water-insoluble.

As has been explained hereinabove, a linker may be advantageously incorporated into the compositions of the present invention. In order for such a linker to be able also to react with the synthetic polymer, at least part of said polymer must comprise reactive groups, i.e. groups that are capable of reacting with at least one of the functions of the linker listed hereinabove.

Although the presence of such reactive groups on at least a fraction of the synthetic polymer is particularly useful and advantageous when the process of the present invention envisions the use of a linker, the presence of reactive groups on the polymer is not necessarily associated with the introduction of a linker into the reactor during the process of the present invention.

Specifically, the Applicant also envisions the use of synthetic polymers comprising reactive groups even when no linker is incorporated into the composition. The compositions obtained at the end of such a process are then not crosslinked, but may be crosslinked subsequently during a separate reactive extrusion process, after incorporation of a suitable linker.

The reactive groups of the synthetic polymer are especially chosen from carboxylic acid, acid anhydride, amine, amide, carbonate, sulfone, imide, urethane, epoxide, hydroxyl, alkoxysilane, oxazoline, oxazolin-5-one and ester functions.

The functionalization of the polymer, for example of a polyolefin, may moreover take place within the reactor itself, for example by reactive extrusion. This functionalization may especially take place on-line on a polymer in softened or melt form before it is placed in contact with the starchy component and/or the plasticizer.

Particularly advantageous compositions obtained in accordance with the invention are characterized in that they comprise:
- from 5% to 50% by weight of a polyolefin chosen from the group formed by polyethylene, polypropylene, polypropylene bearing acid anhydride groups, polyethylene bearing acid anhydride groups, and mixtures thereof, and
- from 50% to 95% by weight of a plasticized starchy component.

Beyond the abovementioned linkers, the polymeric composition, which is especially thermoplastic, according to the invention may also comprise various other additives. These may be products directed toward improving its physico-chemical properties, in particular its processing behavior and its durability, or alternatively its mechanical, thermal, conductive, adhesive or organoleptic properties.

The additive may be an agent for improving or adjusting the mechanical or thermal properties, chosen from minerals, salts and organic substances, in particular from nucleating agents such as talc, compatibilizers such as surfactants, agents for improving the impact strength or the scratch resistance, such as calcium silicate, shrinkage regulators such as magnesium silicate, agents for trapping or deactivating water, acids, catalysts, metals, oxygen, infrared rays or UV rays, hydrophobizing agents such as oils and fats, hygroscopic agents such as pentaerythritol, flame retardants and fireproofing agents such as halogenated derivatives, smoke retardants, mineral or organic reinforcing fillers, such as clays, carbon black, talc, plant fibers, glass fibers, polyacrylonitrile or kevlar.

The additive may also be an agent for improving or adjusting the conductive or insulating properties with respect to electricity or heat, the leaktightness, for example to air, water, gases, solvents, fatty substances, spirits, flavors and fragrances, chosen especially from minerals, salts and organic substances, in particular from nucleating agents such as talc, compatibilizers such as surfactants, agents for trapping or deactivating water, acids, catalysts, metals, oxygen or infrared radiation, hydrophobizing agents such as oils and fats, nacreous agents, hygroscopic agents such as pentaerythritol, heat-conducting or heat-dissipating agents such as metal powders, graphites and salts, and micrometric reinforcing fillers such as clays and carbon black.

The additive may also be an agent for improving the organoleptic properties, especially:
- the odor properties (fragrances or odor-masking agents),
- the optical properties (gloss agents, whitening agents such as titanium dioxide, dyes, pigments, dye extenders, opacifiers, matting agents such as calcium carbonate, thermochromic agents, phosphors and fluorophores, metallizing or marbling agents and antifogging agents),
- the acoustic properties (barium sulfate and barytes), and
- the tactile properties (fats).

The additive may also be an agent for improving or adjusting the adhesive properties, especially the adhesion to cellulose-based materials such as paper or wood, metals such as aluminum and steel, glass or ceramic materials, textiles and minerals, especially such as pine resins, colophony, ethylene/vinyl alcohol copolymers, fatty amines, lubricants, release agents, antistatic agents and antiblocking agents.

Finally, the additive may be an agent for improving the durability of the material or an agent for controlling its (bio) degradability, chosen especially from hydrophobizing agents such as oils and fats, anticorrosion agents, antimicrobial agents such as Ag, Cu and Zn, degradation catalysts such as oxo-catalysts and enzymes such as amylases.

A subject of the present invention is also compositions that may be obtained via a process as described above.

Although they may be chemically similar to the compositions described in patent applications 08 50659 and 08 50660, such compositions differ therefrom by a less pronounced or even absent coloration, due to reduced thermal degradation of the incorporated starchy component.

The compositions of the present invention preferably have a white to pale yellow color.

This coloration may especially be characterized by the colorimetric method described below, based on the CIE L*a*b* principle, the model of international representation of colors (referred to hereinbelow as the "CIELab method").

The measuring instrument used for this color determination is a Minolta brand colorimeter of CR-200 type, dedicated to this type of measurement.

The measuring protocol is as follows:

The compositions, exiting the extruder, are tested in the form of cylindrical granules 2 to 4 mm long and 2 to 3 mm in diameter. They are introduced into a plastic jar (5 cm in diameter, 10 cm high), to a depth of about 7 cm. The reading head of the colorimeter is then applied perpendicularly to the surface of the jar, in contact with the granules, in order to determine their coloration. Three successive measurements are thus taken for each analysis point of the surface of the granules. These measurements are averaged to obtain the L*a*b* values at the point of observation.

Four series of measurements are taken on each of the samples subjected to the test, before mixing the jar between each series of measurements.

The following are determined for each composition thus tested by the CIELab method:
- the lightness index L*,
- the a* component, and
- the b* component.

It is seen that, with regard to the compositions according to the prior art and for which the starchy component is plasticized before being placed in contact with the thermoplastic polymer, the compositions of the present invention have a markedly improved coloration and especially:
- a substantially increased lightness index L* which tends towards 100,
- a lowered a* component that is very close to 0, and
- a significantly lowered b* component that approaches 0.

The compositions of the present invention may especially be characterized by a coloration, measured according to the abovementioned CIELab method, such that:
- their lightness index L* is greater than 60 and in particular greater than 65, and
- their b* component is between 0 and +15 and in particular between 0 and +10.

According to one variant, said compositions have, in a noteworthy manner: a) a lightness index L* at least equal to 70 and b) a b* component of between 0 and +6.

Moreover, said compositions generally have, as mentioned, an a* component close to 0, generally between −1 and +3.5 and in particular between −0.5 and +1.5.

In an entirely noteworthy manner, this a* component may be between −0.5 and +0.5.

To the Applicant's knowledge, no polymeric composition, especially thermoplastic composition, existed hitherto characterized in that:

firstly, it contains from 15% to 85% and preferably from 15% to 80% by weight of at least one starchy component, from 4% to 35% by weight of at least one plasticizer for said starchy component and from 5% to 80% and preferably from 15% to 80% by weight of at least one synthetic polymer, and secondly, it has a lightness index L* of greater than 65 and a b* component of between 0 and +10.

In an entirely noteworthy manner, this novel composition may also be characterized in that:

it contains from 15% to 70% and preferably from 15% to 60% by weight of at least one starchy component, from 4% to 25% by weight of at least one plasticizer for said starchy component and from 15% to 80% and preferably from 35% to 80% by weight of at least one synthetic polymer, and/or said synthetic polymer is chosen from the group comprising polyethylenes (PE) and polypropylenes (PP), which are optionally functionalized, polyamides (PA), thermoplastic polyurethanes (TPU), styrene-ethylene-butylene-styrene (SEBS) copolymers, which are preferably functionalized, amorphous polyethylene terephthalates) (PETG), and mixtures thereof, and/or it has a lightness index L* at least equal to 70 and a b* component of between 0 and +6, and/or it has an a* component of between −0.5 and +1.5 and especially between −0.5 and +0.5.

In addition, the compositions of the present invention generally have a translucent to transparent aspect since they contain no or virtually no (generally less than 1% by weight) compounds used as fillers or pigments, for instance calcium carbonate, calcite, titanium dioxide, glass fibers, plant fibers, wood particles, etc.

Moreover, the compositions of the present invention, when they have been prepared by reactive extrusion in the presence of a linker, have advantageous properties at least equivalent to those of the compositions of the prior art (French patent applications 08 50659 and 08 50660).

These properties are the following:

a content of matter that is insoluble in water, at 20° C., of greater than 72%, preferably greater than 80% and in particular greater than 90%;

a degree of swelling, after immersion in water at 20° C. for 24 hours, of less than 20%, preferably less than 12% and better still less than 6%;

an elongation at break of greater than 40%, preferably greater than 80% and in particular greater than 90%;

a maximum ultimate stress of greater than 4 MPa, preferably greater than 6 MPa and in particular greater than 8 MPa.

In an entirely noteworthy manner, the compositions of the present invention, when they have been prepared by reactive extrusion in the presence of a linker, may have one or more properties that are further improved relative to those mentioned above, and especially:

a content of matter that is insoluble in water, at 20° C., of greater than 95%, or even 97%, or even 98%; and/or an elongation at break of greater than 100%, or even 200%, or even 300%; and/or a maximum ultimate stress of greater than 10 MPa, or even 12 MPa, or even 13 MPa.

In a particularly noteworthy manner, said compositions may have a very high elongation at break, i.e. greater than 400%, or even 500%, or even 700%.

Also in a noteworthy manner, the compositions of the present invention, when they have been prepared by reactive extrusion in the presence or absence of a linker, may have:

an elongation at break of greater than 100%, or even 200%, or even 300%, and a maximum ultimate stress of greater than 15 MPa, or even 20 MPa, or even 25 MPa.

This is especially the case when:

said composition comprises from 15% to 70% and preferably from 15% to 60% by weight of at least one starchy component, from 4% to 25% by weight of at least one plasticizer of said starchy component and from 15% to 80% and preferably from 35% to 80% by weight of at least one synthetic polymer, and said synthetic polymer is chosen from the group comprising polyethylenes (PE) and polypropylenes (PP), which are optionally functionalized, polyamides (PA), thermoplastic polyurethanes (TPU), styrene-ethylene-butylene-styrene (SEBS) copolymers, which are preferably functionalized, amorphous polyethylene terephthalates) (PETG), and mixtures thereof.

Under such conditions, said composition may especially have an elongation at break at least equal to 350% and especially between 350% and 1500%.

Also in a noteworthy manner, the compositions of the present invention, when they have been prepared by reactive extrusion in the presence or absence of a linker, may have a content of matter that is insoluble in water at 20° C., measured as described below, of greater than 90%, preferably greater than 95% and especially greater than 97%.

The characteristics that have just been mentioned may be measured according to the tests described below.

Measurement of the Content of insoluble Matter and the degree of Swelling:

The content of water-insoluble matter is determined according to the following protocol:

(i) Dry the sample of composition to be characterized (12 hours at 80° C. under vacuum).

(ii) Measure the mass of the sample (=Ms1) with a precision balance.

(iii) Immerse the sample in water at 20° C. (volume of water in ml equal to 100 times the mass in g of sample).

(iv) Collect the sample after a defined time of several hours.

(v) Remove the excess surface water with blotting paper, as quickly as possible.

(vi) Place the sample on a precision balance and monitor the loss of mass over 2 minutes (measurement of the mass every 20 seconds).

(vii) Determine the mass of the swollen sample by graphic representation of the preceding measurements as a function of time and extrapolation to t=0 of the mass (=Mg).

(viii) Dry the sample (for 24 hours at 80° C. under vacuum). Measure the mass of the dry sample (=Ms2).

(ix) Calculate the content of insoluble matter, expressed as a percentage, according to the formula Ms2/Ms1.

(x) Calculate the degree of swelling, as a percentage, according to the formula (Mg-Ms1)/Ms1.

Measurement of the Mechanical Properties:

The tensile mechanical characteristics of a composition are determined, according to standard NF T51-034 (Determination of tensile properties) using a Lloyd Instrument LR5K test bench, a traction speed: 50 mm/min and standardized specimens of H2 type.

From the tensile curves (stress=f(elongation)), obtained at a drawing speed of 50 mm/minute, the elongation at break and the corresponding maximum ultimate stress are recorded for the test composition.

The compositions in accordance with the invention may especially be used:
- as resins intended for the direct preparation of injection-molded, extruded or film-form articles,
- as resins intended to be formulated in the form of mixtures with fillers, pigments and/or fibers (mixtures of "compound" type), said mixtures themselves being intended for the direct preparation of articles, for example intended for the motor vehicle or aeronautics industry,
- as resins intended to be formulated in the form of mixtures with dyes, antistatic agents, antiblocking agents, stabilizers, nucleating agents, crosslinking agents and/or other agents (mixtures of "masterbatch" type), said mixtures being themselves intended for the final preparation of a wide variety of articles,
- as additives for synthetic polymers, in particular polyolefins, in order to improve their physicochemical and mechanical properties, for example their shockproof and impact strength properties,
- as sources of carbon of renewable origin, which may be readily incorporated into synthetic polymers, especially polyolefins.

EXAMPLE 1

Preparation of Compositions According to a Process of the Prior Art Starting with a Thermoplastic Starch The following are used for this example:
- as starchy component (component 2), a native wheat starch sold by the Applicant under the name "Amidon de blé SP" with a water content in the region of 12%,
- as plasticizer (component 3), a concentrated aqueous composition of polyols based on glycerol and sorbitol, sold by the Applicant under the name Polysorb® G 84/41/00 with a water content of about 16%.

Starting with these two products, a thermoplastic starch (TPS) composition according to the prior art is prepared. To do this, a TSA brand twin-screw extruder with a diameter (D) of 26 mm and a length of 50 D is fed with the wheat starch and the plasticizer, so as to obtain a total material throughput of 15 kg/h, the plasticizer/wheat starch ratio being set at 67 parts/100 parts (Composition AP6040).

The extrusion conditions are as follows:
- temperature profile (ten heating zones Z1 to Z10): 90/90/110/140/140/110/90/90/90/90
- screw speed: 200 rpm.

On exiting the extruder, it is found that the material thus obtained is too tacky to be granulated on equipment commonly used with synthetic polymers. It is also found that the composition is too water-sensitive to be cooled in a tank of cold water. For these reasons, the plasticized starch rods are air-cooled on a conveyor belt and are then dried at 80° C. in a vacuum oven for 24 hours, and then granulated.

The water uptake of this plasticized starch is determined according to the following test:
Water uptake test:
The water uptake is determined by measuring the mass of a sample after storage for one month, before drying ($M_h$) and after drying under vacuum at 80° C. for 24 hours ($M_s$). The water uptake corresponds to the difference ($1-M_s/M_h$) expressed as a percentage.

The insoluble matter content of this plasticized starch is also measured after immersion in water for 1 hour, 3 hours and 24 hours, respectively, according to the test described previously in the general description.

The results obtained for the thermoplastic starch thus prepared are as follows:
Water uptake: 5.8%
Insoluble matter content (after 1 hour/3 hours/24 hours of immersion): 86.3%/74.1%/63.7%

Starting with this thermoplastic starch, an alloy 1 was prepared, containing 50% by weight in total of a synthetic polymer blend (component 1) based on polyolefins formed, for half of it, from commercial polypropylene, and, for the other half, from maleic anhydride-grafted polypropylene.

The extrusion conditions are given below.
- Dry mixing of the polypropylenes (50% by weight in total) and of the thermoplastic starch (50% by weight) in the main hopper
- Screw speed: 400 rpm
- Temperature profile (in ° C. for each of the ten heating zones Z1 to Z10): 200/120/140/140/160/170/160/150/160/160

Alloy 1 thus obtained has a brown coloration.

It has the following coloration, measured according to the "CIELab method" described hereinabove:
- a lightness index L* very significantly less than 60,
- a b* component very significantly greater than +15, and
- an a* component greater than 3.5.

The results obtained with this alloy 1 obtained according to the prior art are as follows:
Insoluble matter content after 24 hours of immersion: 94.5%
Moisture content: 2.1%
Degree of swelling after 24 hours of immersion: 10%
Elongation at break: 220%
Maximum ultimate stress: 15 MPa.

Using the same thermoplastic starch as obtained previously, an alloy 2 was prepared, containing:
- 49% by weight in total of a synthetic polymer blend (component 1) formed, for half of it, from commercial polypropylene and, for the other half, from maleic anhydride-grafted polypropylene, and
- 2% in total of a linker, in this case isophorone diisocyanate (IPDI).

The extrusion conditions are given below.
- Dry mixing of the polypropylenes (49% by weight in total), of the thermoplastic starch (49% by weight) and of the IPDI (2%) in the main hopper
- Screw speed: 400 rpm
- Temperature profile (in ° C. for each of the ten heating zones Z1 to Z10): 200/120/140/140/160/170/160/150/160/160.

Alloy 2 thus obtained has a dark yellow coloration.

The results obtained with this alloy 2 obtained according to the prior art are as follows:
Insoluble matter content after 24 hours of immersion: 98.2%
Moisture content: 2.1%
Degree of swelling after 24 hours of immersion: 14%
Elongation at break: 190%
Maximum ultimate stress: 15 MPa.

This Example 1 for which the starch/polyolefin alloys were prepared from a preplasticized starch showed that said alloys had a coloration that was not satisfactory. When measured according to the "CIELab method" described hereinabove, this coloration especially gave the overall results below:

a lightness index L* of less than, or even substantially less than, 60, also for alloy 2, and a b* component greater than, or even very significantly greater than, +15, also for alloy 2.

EXAMPLE 2

Preparation of Compositions According to the Invention

In the context of this example, in accordance with the invention, the same extrusion equipment as that described in Example 1 and the same extrusion conditions as those used for the preparation of the alloy in Example 1 are used, and especially the following temperature profile (in ° C. for each of the ten heating zones Z1 to Z10): 200/120/140/140/160/170/160/150/160/160.

The products used are identical in nature and proportions to those used for the production, respectively, of alloys 1 and 2 described in Example 1.

However, in the present case, there is no prior preparation of a thermoplastic starch, but separate introduction, within the meaning of the invention, of the nonplasticized starchy component (component 2) and of its plasticizer (component 3) and also, optionally, of the linker into the extruder already containing the polymer blend (component 1) in a molten form.

According to a first variant (alloy 1' according to the invention), there is no use of linker. According to a second variant (alloy 2' according to the invention), a linker is used (2% of IPDI), this being introduced at the end of the line after removal of the water.

More specifically, the following are introduced into the extruder:

the polymer blend into the main hopper of the extruder, after which said mixture passes through all ten heating zones Z1 to Z10 of the extruder, the plasticizer for the starchy component (Polysorb®) into zone Z2, and the starchy component (nonplasticized wheat starch) into zone Z3, the optional linker into zone Z7.

It should be noted that the removal of the water (slight pressure reduction) is performed in zone Z6.

The results obtained with alloy 1' prepared according to the invention are as follows:

Coloration: pale yellow

Insoluble matter content after 24 hours of immersion: 97.4%

Degree of swelling after 24 hours of immersion: 9%

Elongation at break: 950%

Maximum ultimate stress: 18 MPa.

Moreover, the results obtained with alloy 2' prepared according to the invention are as follows:

Coloration: translucent white

Insoluble matter content after 24 hours of immersion: 98.4%

Degree of swelling after 24 hours of immersion: 2.9%

Elongation at break: 630%

Maximum ultimate stress: 15 MPa.

This Example 2 according to the invention showed that said alloys had a coloration that was significantly improved relative to that obtained for the alloys of Example 1. When measured according to the "CIELab method" described hereinabove, this coloration especially gave the following overall results:

a lightness index L* of greater than, or even very significantly greater than, 60, or even 70 as for alloy 2', and a b* component of less than, or even very significantly less than, +15, or even +10 as for alloy 2'.

In addition, the a* component of these alloys obtained in accordance with the invention were always between −0.5 and +1.5, or even between −0.5 and +0.5 as for alloy 2'.

These results show that the compositions obtained in accordance with the invention have overall coloration characteristics and also mechanical characteristics that are improved with regard to compositions prepared according to the prior art, for which the starchy component is plasticized before being placed in contact with the synthetic polymer.

These improved characteristics make it possible to envision broadened fields of application for the compositions according to the invention, especially as a result of their noteworthy properties in terms of elongation at break, which properties may be exploited in the context of industrial drawing operations in order to obtain films or fibers, including textiles, or other articles that are both thin and strong.

EXAMPLE 3

Preparation of a Composition According to a Process of the Prior Art from a Thermoplastic Starch Starting with the thermoplastic starch described previously in Example 1, an alloy 3 was prepared, containing 50% by weight in total of a synthetic polymer (component 1) formed from a commercial polyamide, which has the following mechanical characteristics:

Elongation at break: >300%

Maximum ultimate stress: >60 MPa.

The extrusion conditions are given below.

Dry mixing of the polyamide (50% by weight in total) and of the thermoplastic starch (50% by weight) in the main hopper Screw speed: 400 rpm Temperature profile (in ° C. for each of the ten heating zones Z1 to Z10): 230/100/100/140/140/140/160/190/190/200.

Alloy 3 thus obtained has a tan-brown coloration.

The mechanical characteristics obtained for this alloy 3 obtained according to the prior art are as follows:

Elongation at break: 60%

Maximum ultimate stress: 17 MPa.

EXAMPLE 4

Preparation of a Composition According to the Invention

In the context of this example, in accordance with the invention, the same extrusion equipment as that described in Example 1 and the same extrusion conditions as those used for the preparation of alloy 3 in Example 3 are used, and especially the following temperature profile (in ° C. for each of the ten heating zones Z1 to Z10): 230/100/100/140/140/140/160/190/190/200.

The products used are identical in nature and proportions to those used for the production of alloy 3 of Example 3.

However, in the present case, there is no prior preparation of a thermoplastic starch, but the separate introduction, within the meaning of the invention, of the nonplasticized starchy component (component 2) and of its plasticizer (component 3) into the extruder already containing the polymer (component 1) in a molten form.

More specifically, the following are introduced into the extruder:
- the polymer into the main hopper of the extruder, after which said mixture passes through all ten heating zones Z1 to Z10 of the extruder,
- the plasticizer for the starchy component (Polysorb®) into zone Z2, and
- the starchy component (nonplasticized wheat starch) into zone Z3.

It should be noted that the removal of the water (slight pressure reduction) is performed in zone Z6.

The results obtained with alloy 3' prepared according to the invention are as follows:
- Coloration: pale yellow
- Lightness index L* of greater than 65, b* component of between 0 and +10 and a* component of between −0.5 and +1.5
- Elongation at break: 350%
- Maximum ultimate stress: 28 MPa.

These results show that a composition obtained in accordance with the invention and containing a polyamide as synthetic polymer has coloration characteristics and also mechanical characteristics that are very significantly improved with regard to a composition prepared according to the prior art for which the starchy component is plasticized before being placed in contact with the polyamide.

EXAMPLE 5

Preparation of a Composition According to a Process of the Prior Art using a Thermoplastic Starch Starting with the thermoplastic starch described previously in Example 1, an alloy 4 was prepared, containing 50% by weight in total of a synthetic polymer (component 1) formed from thermoplastic polyurethane (TPU) sold under the brand name Estane 58277.

The extrusion conditions are given below.
- Dry mixing of the TPU (50% by weight in total) and of the thermoplastic starch (50% by weight) in the main hopper
- Screw speed: 300 rpm
- Temperature profile (in ° C. for each of the ten heating zones Z1 to Z10): 180/180/160/140/140/130/130/160/160/160.

Alloy 4 thus obtained has a brown coloration.

The mechanical characteristics of this alloy, obtained according to the prior art, are as follows:
- Elongation at break: 500%
- Maximum ultimate stress: 20 MPa.

EXAMPLE 6

Preparation of Compositions According to the Invention

In the context of this example, in accordance with the invention, the same extrusion equipment as that described in Example 1 and the same extrusion conditions as those used for the preparation of alloy 4 in Example 5 are used, and especially the following temperature profile (in ° C. for each of the ten heating zones Z1 to Z10): 180/180/160/140/140/130/130/160/160/160.

The products used are identical in nature and proportions to those used to obtain alloy 4 of Example 5.

However, in the present case, there is no prior preparation of a thermoplastic starch, but the separate introduction, within the meaning of the invention, of the nonplasticized starchy component (component 2) and of its plasticizer (component 3) into the extruder already containing the polymer (component 1) in a molten form.

More specifically, the following are introduced into the extruder:
- the polymer into the main hopper of the extruder, after which said mixture passes through all ten heating zones Z1 to Z10 of the extruder,
- the plasticizer for the starchy component (Polysorb®) into zone Z2, and
- the starchy component (nonplasticized wheat starch) into zone Z3.

It should be noted that the removal of the water (slight pressure reduction) is performed in zone Z6.

The results obtained with alloy 4' prepared according to the invention are as follows:
- Coloration: pale yellow
- Lightness index L* greater than 65, b* component between 0 and +10 and a* component between −0.5 and +1.5
- Elongation at break: 500%
- Maximum ultimate stress: 20 MPa.

These results show that a composition obtained in accordance with the invention and containing a thermoplastic polyurethane (TPU) as synthetic polymer has coloration characteristics that are very significantly improved with regard to a composition prepared according to the prior art for which the starchy component is plasticized before being placed in contact with the TPU.

This improvement is achieved without harming the mechanical characteristics of said composition.

In a noteworthy manner, the Applicant Company has moreover observed that when this composition according to the invention was, under the same extrusion conditions as those described above, modified so as to contain, respectively, by weight: a) 67% of component 1; b) 19.8% of component 2 and c) 13.2% of component 3, the coloration characteristics and also the mechanical characteristics of the alloy obtained (alloy 4") could again be very significantly improved, namely:
- Coloration: transparent
- Lightness index L* greater than 70, b* component between 0 and +6 and a* component between −0.5 and +0.5
- Elongation at break: 750%
- Maximum ultimate stress: 35 MPa.

The coloration and mechanical characteristics of this alloy 4" thus approach those of the synthetic polymer (TPU) per se.

EXAMPLE 7

Preparation of Compositions According to the Invention

In the context of this example, in accordance with the invention, the same extrusion equipment as that described in Example 1 is used.

The temperature profile used is as follows (in ° C. for each of the ten heating zones Z1 to Z10): 180/100/100/140/180/180/180/180/180/180.

The products used are identical in nature and proportions to those used for the production of alloy 3 of Example 3. The only exception is the nature of the polymer, which, in this case, is a PETG and more particularly a polyethylene terephthalate-co-1,4-cyclohexanedimethylene terephthalate).

However, in the present case, there is no prior preparation of a thermoplastic starch, but the separate introduction, within the meaning of the invention, of the nonplasticized starchy component (component 2) and of its plasticizer (component 3) into the extruder containing the PETG (component 1), in a molten form.

More specifically, the following are introduced into the extruder:
- the polymer into the main hopper of the extruder, after which said mixture passes through all ten heating zones Z1 to Z10 of the extruder,
- the plasticizer for the starchy component (Polysorb®) into zone Z2, and
- the starchy component (nonplasticized wheat starch) into zone Z3.

It should be noted that the removal of the water (slight pressure reduction) is performed in zone Z6.

The results obtained with alloy 5' prepared according to the invention are as follows:
- Coloration: pale yellow
- Lightness index L* greater than 65, b* component between 0 and +10 and a* component between −0.5 and +1.5
- Elongation at break: 100%
- Maximum ultimate stress: 20 MPa.

In a noteworthy manner, the Applicant Company moreover observed that when this composition according to the invention was, under the same extrusion conditions as those described above, modified so as to contain, respectively, by weight: a) 67% of component 1; b) 19.8% of component 2 and c) 13.2% of component 3, the mechanical characteristics of the alloy obtained (alloy 5″) could again be very significantly improved, namely:
- Elongation at break: 380%
- Maximum ultimate stress: 30 MPa.

This improvement is obtained without harming the coloration characteristics of said composition, which remains pale yellow.

EXAMPLE 8

Preparation of a Composition According to the Invention

In the context of this example, in accordance with the invention, the same extrusion equipment as that described in Example 1 is used.

The temperature profile used is the following (in ° C. for each of the ten heating zones Z1 to Z10): 230/100/100/150/210/210/210/180/190/190.

The products used are identical in nature and proportions to those used to obtain alloy 3 of Example 3. The only difference is the nature of the polymer, which, in this case, is a poly (styrene-b-(ethylene-co-butadiene)-b-styrene) or SEBS copolymer, grafted with 1% maleic anhydride.

However, in the present case, there is no prior preparation of a thermoplastic starch, but the separate introduction, within the meaning of the invention, of the nonplasticized starchy component (component 2) and of its plasticizer (component 3) into the extruder containing the grafted SEBS (component 1) in a molten form.

More specifically, the following are introduced into the extruder:
- the polymer into the main hopper of the extruder, after which said mixture passes through all ten heating zones Z1 to Z10 of the extruder,
- the plasticizer for the starchy component (Polysorb®) into zone Z2, and
- the starchy component (nonplasticized wheat starch) into zone Z3.

It should be noted that the removal of the water (slight pressure reduction) is performed in zone Z6.

The results obtained with alloy 6' prepared according to the invention are as follows:
- Coloration: pale yellow
- Lightness index L* greater than 65, b* component between 0 and +10 and a* component between −0.5 and +1.5
- Elongation at break: >1300%
- Maximum ultimate stress: 22 MPa.

The invention claimed is:

1. A process for preparing a composition based on a synthetic polymer and on a starchy component, comprising:
the introduction, into a reactor containing a softened or molten synthetic polymer (component 1), of a non plasticized starchy component (component 2) and of a plasticizer thereof (component 3), and
blending of the mixture obtained under conditions sufficient to obtain plasticization of the starchy component (component 2) by the plasticizer (component 3) and a homogeneous mixture of the synthetic polymer and of the plasticized starchy component.

2. The process as claimed in claim 1, comprising:
the introduction, into a reactor containing a thermoplastic synthetic polymer (component 1), subjected to shear forces and heated to a temperature between 60° C. and 260° C., of a non plasticized starchy component (component 2) and of a plasticizer thereof (component 3), and
the blending of the mixture obtained, at a temperature of between 60° C. and 260° C., with a shear force and for a time that are sufficient to obtain plasticization of the starchy component (component 2) by the plasticizer (component 3) and a homogeneous mixture of the polymer and of the plasticized starchy component.

3. The process as claimed in claim 1, wherein some or all of the non plasticized starchy component or of the plasticizer thereof is introduced into the reactor at the same time as the softened or molten synthetic polymer.

4. The process as claimed in claim 1, wherein the starchy component and the plasticizer are introduced into the reactor via two separate inlets, these two inlets being different from the inlet for the softened or molten synthetic polymer.

5. The process as claimed in claim 1, wherein the plasticizer is introduced into the reactor and incorporated into the synthetic polymer before the introduction of the non plasticized starchy component.

6. The process as claimed in claim 5, comprising the following successive steps:
(a) introduction of a thermoplastic synthetic polymer into an extruder,
(b) heating and blending of the thermoplastic synthetic polymer at a temperature of between 60° C. and 260° C.,
(c) introduction into the extruder of a plasticizer of a starchy component added in the following step, and incorporation of said plasticizer into the heated thermoplastic synthetic polymer,
(d) introduction of a non plasticized starchy component into the extruder and incorporation of said non plasticized starchy component into the mixture obtained in the preceding step,
(e) blending of the mixture obtained, at a temperature of between 60° C. and 260° C., with a shear force and for a time that are sufficient to obtain plasticization of the starchy component by the plasticizer and a homogeneous mixture of the polymer and of the plasticized starchy component, and
(f) forming of the homogeneous mass obtained.

7. The process as claimed in claim 1, wherein the temperature:
of the softened or molten synthetic polymer when it is placed in contact with the non plasticized starchy component, and
of the plasticization of the starchy component by the plasticizer thereof,
is comprised between 80° C. and 240° C.

8. The process as claimed in claim 7, wherein:
said temperatures are comprised between 120° C. and 200° C., and
the synthetic polymer is chosen from the group consisting of polyolefins.

9. The process as claimed in claim 7, wherein:
said temperatures are comprised between 100° C. and 230° C., and
the synthetic polymer is chosen from the group consisting of polyamides (PA), thermoplastic polyurethanes (TPU), styrene-butylene-styrene (SBS) and styrene-ethylene-butylene-styrene (SEBS) copolymers, styrene-butylene-styrene (SBS) and styrene-ethylene-butylene-styrene (SEBS) copolymers functionalized with maleic anhydride units.

10. The process as claimed in claim 7, wherein:
said temperatures are comprised between 100° C. and 180° C., and
the synthetic polymer is amorphous poly(ethylene terephthalate) (PETG).

11. The process as claimed in claim 1, wherein the synthetic polymer is a non-biodegradable polymer.

12. The process as claimed in claim 1, wherein the synthetic polymer is non biodegradable or non compostable within the meaning of standards EN 13432, ASTM D 6400 and ASTM D 6868.

13. The process as claimed in claim 1, wherein the synthetic polymer is a polymer containing at least 50% of carbon of repreviously presentedable origin within the meaning of standard ASTM D 6852 and/or standard ASTM D 6866, relative to the total carbon present in said polymer.

14. The process as claimed in claim 1, wherein the synthetic polymer is water-insoluble.

15. The process as claimed in claim 1, wherein the synthetic polymer is chosen from the group consisting of polyethylene (PE), polypropylene (PP), functionalized polyethylene, functionalized polypropylene, polyamides (PA), thermoplastic polyurethanes (TPU), styrene-ethylene-butylene-styrene (SEBS) copolymers, functionalized styrene-ethylene-butylene-styrene copolymers, amorphous poly(ethylene terephthalate) (PETG) and mixtures thereof.

16. The process as claimed in claim 1, wherein the starchy component is incorporated into the synthetic polymer in a proportion of from 20% to 1000% by dry weight relative to the dry weight of the synthetic polymer present in the composition.

17. The process as claimed in claim 16, wherein the starchy component is incorporated into the synthetic polymer in a proportion of from 25% to 150% by dry weight, relative to the dry weight of the synthetic polymer present in the composition.

18. The process as claimed in claim 1, wherein the plasticizer is used in a proportion of from 25 to 120 parts by weight per 100 parts by weight of starchy component.

19. The process as claimed in claim 1, further comprising a step of incorporating at least one linker (component 4) chosen from the group consisting of compounds bearing at least two identical or different free or masked functions, chosen from the group consisting of isocyanate, carbamoylcaprolactam, epoxide, halo, protonic acid, acid anhydride, acyl halide, oxychloride, trimetaphosphate and alkoxysilane functions, this step of incorporation of a linker being subsequent to the incorporation of the non plasticized starchy component (component 2) and of the plasticizer thereof (component 3) into the thermoplastic polymer.

20. The process as claimed in claim 19, wherein the linker is a diisocyanate.

21. The process as claimed in claim 20, wherein the linker is isophorone diisocyanate (IPDI) or dicyclohexylmethane diisocyanate (H12MDI).

22. The process as claimed in claim 19, wherein the amount of linker is comprised between 0.1% and 12% relative to the total weight of the mixture containing the synthetic polymer, the starchy component and the plasticizer.

23. A process for preparing a composition based on a synthetic polymer and on a starchy component, comprising
introducing into a reactor containing a softened or molten synthetic polymer, a non plasticized starchy component and a plasticizer, said plasticized starch component and said plasticizer being added simultaneously; and
mixing the synthetic polymer with said non plasticized starchy component and plasticizer under conditions sufficient to obtain plasticization of the starchy component by the plasticizer and a homogeneous mixture of the synthetic polymer and of the plasticized starchy component.

24. The process as claimed in claim 23, wherein the non plasticized starchy component and the plasticizer are simultaneously added as a mixture.

* * * * *